US012571244B2

(12) United States Patent
Wu et al.

(10) Patent No.: US 12,571,244 B2
(45) Date of Patent: Mar. 10, 2026

(54) DAMPING HINGE AND DAMPING ASSEMBLY

(71) Applicant: Tengqing Wu, Guangdong (CN)

(72) Inventors: Tengqing Wu, Guangdong (CN); Jiqing Wu, Guangdong (CN); Jie Chen, Guangdong (CN)

(73) Assignee: Tengqing Wu

(*) Notice: Subject to any disclaimer, the term of this patent is extended or adjusted under 35 U.S.C. 154(b) by 0 days.

(21) Appl. No.: 18/716,135

(22) PCT Filed: Mar. 28, 2022

(86) PCT No.: PCT/CN2022/083276
§ 371 (c)(1),
(2) Date: Jun. 3, 2024

(87) PCT Pub. No.: WO2023/173469
PCT Pub. Date: Sep. 21, 2023

(65) Prior Publication Data

US 2025/0043612 A1 Feb. 6, 2025

(30) Foreign Application Priority Data

Mar. 17, 2022 (CN) ......................... 202210267722.8
Mar. 17, 2022 (CN) ......................... 202220607480.8

(51) Int. Cl.
*E05F 3/22* (2006.01)
*E05D 3/02* (2006.01)
(Continued)

(52) U.S. Cl.
CPC .................. *E05F 3/06* (2013.01); *E05D 3/02* (2013.01); *E05F 1/12* (2013.01)

(58) Field of Classification Search
CPC ... E05F 1/08; E05F 1/10; E05F 1/1041; E05F 1/1091; E05F 1/12; E05F 1/1223;
(Continued)

(56) References Cited

U.S. PATENT DOCUMENTS 8,650,711 B1 * 2/2014 Chen ....................... E05F 5/006 16/296
8,689,402 B2 * 4/2014 Brunnmayr ............... E05D 3/02 16/296
(Continued)

FOREIGN PATENT DOCUMENTS

CN 103590692 A 2/2014
CN 203441235 U 2/2014
(Continued)

OTHER PUBLICATIONS

"International search report" mailed on Nov. 25, 2022 for international application No. PCT/CN2022/083276, international filing date: Mar. 28, 2022.

*Primary Examiner* — Chuck Y Mah
(74) *Attorney, Agent, or Firm* — Winston Hsu

(57) ABSTRACT

The present application discloses a damping hinge and a damping assembly, the damping hinge comprises: a cup body member, an arm body member, a rotating arm member for connecting the cup body member and the arm body member, and a damping assembly located in a cup body cup body cavity, wherein the damping assembly comprises: a damper, located in the cup body cup body cavity, a side ear body being provided at one side of the damping member; an oil cylinder sleeve seat, fixed in the cup body cavity, comprising a movement cavity for the damper to move and a track for the side ear body to move; a switch toggle member, movably connected to a sleeve seat platform of the oil cylinder sleeve seat, the switch toggle member comprising a toggle column extending into the sleeve seat platform,
(Continued)

wherein under the action of external force, the switch toggle member is toggled from a first position to a second position. The present application solves the problem of a door closing being abnormally slow or unable to close due to the weight of the door being too large or the service life being too long; the service life of the damping hinge is improved.

18 Claims, 7 Drawing Sheets

(51) Int. Cl.
*E05F 1/12* (2006.01)
*E05F 3/06* (2006.01)

(58) Field of Classification Search
CPC ..... E05F 1/1246; E05F 1/1253; E05F 1/1261; E05F 1/1292; E05F 1/14; E05F 5/006; E05F 5/02; E05F 5/027; E05F 5/06; E05F 8/10; E05F 3/20; E05F 3/18; E05D 7/123; E05D 11/1021; E05D 3/12; E05D 3/14; E05D 3/16; E05D 11/10; E05D 15/40; E05D 15/401; E05D 15/405; E05D 15/406; E05D 15/42; E05D 15/58; E05D 15/565; E05D 3/142; E06B 3/5045; E05Y 2800/22; E05Y 2900/20; E05Y 2900/202; E05Y 2900/208; E05Y 2900/21; E05Y 2201/21; E05Y 2201/264; E05Y 2201/212; E05Y 2201/604; E05Y 2201/626; E05Y 2600/41
See application file for complete search history.

(56) References Cited

U.S. PATENT DOCUMENTS

| | | | | |
|---|---|---|---|---|
| 10,260,267 | B2 * | 4/2019 | Kirenci | E05F 3/20 |
| 10,435,935 | B2 * | 10/2019 | Zimmer | E05F 5/006 |
| 11,078,705 | B2 * | 8/2021 | Salice | E05F 1/1246 |
| 2013/0145580 | A1 * | 6/2013 | Brunnmayr | E05F 5/02<br>16/84 |
| 2017/0107749 | A1 * | 4/2017 | McGregor | E05F 5/006 |
| 2017/0254128 | A1 * | 9/2017 | Ng | E05D 3/02 |
| 2018/0355651 | A1 * | 12/2018 | Liang | E05D 11/00 |
| 2021/0032919 | A1 * | 2/2021 | Peer | E05F 5/006 |

FOREIGN PATENT DOCUMENTS

| | | | |
|---|---|---|---|
| CN | 103711393 | | 4/2014 |
| CN | 203559684 | U | 4/2014 |
| CN | 103835603 | A | 6/2014 |
| CN | 103953236 | A | 7/2014 |
| CN | 203684869 | U | 7/2014 |
| CN | 203729743 | U | 7/2014 |
| CN | 203856309 | U | 10/2014 |
| CN | 204283050 | U | 4/2015 |
| CN | 104727684 | A | 6/2015 |
| CN | 204531838 | U | 8/2015 |
| CN | 104989203 | A | 10/2015 |
| CN | 104989204 | A | 10/2015 |
| CN | 204804540 | U | 11/2015 |
| CN | 204899522 | U | 12/2015 |
| CN | 210976999 | U | 7/2020 |
| CN | 211287176 | U | 8/2020 |
| EP | 2998497 | A1 | 3/2016 |
| JP | 3181984 | U | 2/2013 |

* cited by examiner

DAMPING HINGE AND DAMPING ASSEMBLY

BACKGROUND OF THE INVENTION

1. Field of the Invention

The embodiment of the present application relates to a field of hinges, particularly to a damping hinge and a damping assembly.

2. Description of the Prior Art

A hinge, also known as a butt hinge, is a mechanical device used to connect two solid bodies and allow relative rotation between them. Hinges can be composed of movable components or foldable materials. Butt hinges are mainly installed on doors and windows, while hinges are more often installed on cabinets, wherein they are mainly classified by material into stainless steel hinges and iron hinges; to provide a better experience for users, hydraulic hinges (also known as damping hinges) have emerged; the characteristic of the damping hinge is that it provides a buffering function when the cabinet door is closed, minimizing the noise caused by the collision with the cabinet body when the cabinet door is closed, however, existing damping hinges are easily affected by the weight and service life of the door body, for example, if the door body is heavy or has a long service life, damping hinges are often prone to a decrease in damping torque, resulting in abnormally slow closing or failure to close. Therefore, how to solve the problem that damping hinges are prone to abnormally slow closing or failure to close due to the heavy weight of the door body or the long service life has become an urgent technical problem that needs to be solved.

SUMMARY OF THE INVENTION

The embodiment of the present application provides a damping hinge and a damping assembly to solve the problem that existing damping hinges are prone to abnormally slow closing or failure to close due to the heavy weight of the door body or the long service life.

In order to solve the above technical problem, the embodiment of the present application provides the following technical solution:

A damping hinge comprises a cup body member, an arm body member, a rotating arm member for connecting the said cup body member and the said arm body member, and a damping assembly located in a cup body cavity of the cup body member, wherein the damping assembly comprises: a damper, located within the cup body cavity, with a side ear body on one side of the damper; an oil cylinder sleeve seat, fixed in the cup body cavity, comprising a movement cavity for the damper to move and a track for the side ear body to move; a switch toggle member, movably connected to a sleeve seat platform of the oil cylinder sleeve seat, comprising a toggle column extending into the sleeve seat platform; wherein under the action of external force, the switch toggle member is toggled from a first position to a second position, the toggle column moves to the track to restrict the range of movement of the side ear body, and restricts the range of movement of the damper in the movement cavity.

As a preferred technical solution of the embodiment of the present application, the bottom of the toggle column has a first inclined surface; the end of the side ear body has a second inclined surface that cooperates with the first inclined surface; wherein, when the switch toggle member is in the second position, under the action of external force, the side ear body is displaced on the track through the second inclined surface cooperating with the first inclined surface.

As a preferred technical solution of embodiment of the present application, the switch toggle member also comprises a barb member, the barb member comprises a first barb and a second barb with barbs directed outward, the outer sides of the first barb and the second barb are both provided with a barb bump; the sleeve seat platform is provided with a first cavity for the toggle column to move and a second cavity for the barb member to move, wherein the second cavity is provided with a cavity groove opposite to the barb bump.

As a preferred technical solution of embodiment of the present application, the oil cylinder sleeve seat comprises: a first sleeve seat main board and a second sleeve seat main board, located on both sides of the bottom of the sleeve seat platform, the first sleeve seat main board, the second sleeve seat main board, and the bottom wall of the cup body cavity form the movement cavity; a first side wing convex body and a second wing convex body, located on both sides of the surface of the sleeve seat platform, configured to buckle into a square hole opposite the position of the cup body member; a first side wing protrusion and a second side wing protrusion, located on one side of the sleeve seat platform away from the arm body member, configured to clamp into a hole in the wall opposite the position of the cup body member.

As a preferred technical solution of the embodiment of the present application, the damper comprises a oil cylinder, a rod body with one end extending into the oil cylinder and the other end resting against the sidewall of the cup body member away from the oil cylinder, and a housing fixedly fitted on the surface of the oil cylinder, the bottom of the housing being inclined, the side ear body located on one side of the housing, wherein the housing comprises: a slider located at the bottom of the housing, configured to flat adhere to the bottom wall of the cup body cavity, the slider is provided with at least one slide rail, wherein a slide bar for the slide rail to slide against is provided opposite the bottom wall; a baffle plate located on one side of the housing away from the side ear body, configured to cooperate with the second sleeve seat main board to restrict the range of movement of the damper.

As a preferred technical solution of the embodiment of the present application, a first end of the rotating arm member extends into the tail of the cup body cavity, connected to the cup body member through a pin; a second end of the rotating arm member is inserted into the U-shaped cavity of a first side arm of the arm body member and connected to the first side arm through a first eccentric pin, wherein: the U-shaped cavity comprises curved ears on both sides, which are configured to tightly hold the rotating arm member; the first eccentric pin comprises a first nail cap located at the head, a first nail pillar located at the middle, and a first nail strip located at the tail; wherein the first nail pillar is configured to extend into a first elliptical hole of the rotating arm member, the first nail strip is threaded through a first circular hole of the arm body member to connect with the arm body member, wherein the radius of the first nail cap is greater than the short radius of the first elliptical hole.

As a preferred technical solution of the embodiment of the present application, it also comprises a cover plate member, covering the surface of a second side arm of the arm body member; a second eccentric pin, comprising a second nail cap located at the head, a second nail pillar located at the middle, and a second nail strip located at the tail; the second nail pillar is configured to extend into a second elliptical hole of the cover plate member, the second nail strip is threaded through a second circular hole of the arm body member to connect with the arm body member, wherein the radius of the second nail cap is greater than the short radius of the second elliptical hole.

As a preferred technical solution of the embodiment of the present application, the cover plate member is provided with two extension buckles extending towards the second side arm near a first side edge of the first side arm, wherein the two extension buckles are opposite to notches on both sides of the second side arm, and the two extensions buckles fit against the notches on both sides of the second side arm; two adjacent side edges of a first side edge of the cover plate member are both provided with guide arms, the guide arms are configured to clamp the second side arm.

As a preferred technical solution of the embodiment of the present application, the cover plate member also is provided with a strip-shaped flange hole and a flange protrusion extending along the hole edge of the strip-shaped flange hole near the direction of the second side arm; the second side arm is provided with a square hole at a position opposite the flange protrusion; wherein the flange protrusion is configured to extend into the square hole.

As a preferred technical solution of the embodiment of the present application, it also comprises a first torsion spring located in a first hole slot of the cup body member and a second torsion spring located in a second hole slot of the cup body member, the first hole slot and the second hole slot are located on both sides of the damping assembly, wherein: the first torsion spring comprises a first straight leg extending in a first direction and a first bent leg extending in a second direction, the first straight leg has a first wear-resistant member; the first straight leg extends along the first direction out of the first hole slot and rests against a first arcuate plate of the rotating arm member; the first bent leg extends along the second direction out of the first hole slot and snaps into a first square hole of the cup body member; the second torsion spring comprises a second straight leg extending in the first direction and a second bent leg extending in the second direction, the second straight leg has a second wear-resistant member; the second straight leg extends along the first direction out of the second hole slot and rests against a second arcuate plate of the rotating arm member; the second bent leg extends along the second direction out of the second hole slot and snaps into a second square hole of the cup body member.

A damping assembly, installed within the cup body cavity of the cup body member of the damping hinge, is configured to provide a buffering force for the arm body member connected through the rotating arm member, wherein the damping assembly comprises: a damper, located within the cup body cavity, with a side ear body on one side of the damper, an oil cylinder sleeve seat, fixed in the cup body cavity, comprising a movement cavity for the damper to move and a track for the side ear body to move; a switch toggle member, movably connected to a sleeve seat platform of the oil cylinder sleeve seat, comprising a toggle column extending into the sleeve seat platform; wherein under the action of external force, the switch toggle member is toggled from a first position to a second position, the toggle column moves to the track to restrict the range of movement of the side ear body, and restricts the range of movement of the damper in the movement cavity.

As a preferred technical solution of the embodiment of the present application, the bottom of the toggle column has a first inclined surface; the end of the side ear body has a second inclined surface that cooperates with the first inclined surface; wherein, when the switch toggle member is in the second position, under the action of external force, the side ear body is displaced on the track through the second inclined surface cooperating with the first inclined surface.

As a preferred technical solution of embodiment of the present application, the switch toggle member also comprises a barb member, the barb member comprises a first barb and a second barb with barbs directed outward, the outer sides of the first barb and the second barb are both provided with a barb bump; the sleeve seat platform is provided with a first cavity for the toggle column to move and a second cavity for the barb member to move, wherein the second cavity is provided with a cavity groove opposite to the barb bump.

As a preferred technical solution of embodiment of the present application, the oil cylinder sleeve seat comprising: a first sleeve seat main board and a second sleeve seat main board, located on both sides of the bottom of the sleeve seat platform, the first sleeve seat main board, the second sleeve seat main board, and the bottom wall of the cup body cavity form the movement cavity; a first side wing convex body and a second wing convex body, located on both sides of the surface of the sleeve seat platform, configured to buckle into a square hole opposite the position of the cup body member; a first side wing protrusion and a second side wing protrusion, located on one side of the sleeve seat platform away from the arm body member, configured to clamp into a hole in the wall opposite the position of the cup body member.

As a preferred technical solution of the embodiment of the present application, the damper comprises a oil cylinder, a rod body with one end extending into the oil cylinder and the other end resting against the sidewall of the cup body member away from the oil cylinder, and a housing fixedly fitted on the surface of the oil cylinder, the bottom of the housing being inclined, the side ear body located on one side of the housing, wherein the housing comprises: a slider located at the bottom of the housing, configured to flat adhere to the bottom wall of the cup body cavity, the slider is provided with at least one slide rail, wherein a slide bar for the slide rail to slide against is provided opposite the bottom wall; a baffle plate located on one side of the housing away from the side ear body, configured to cooperate with the second sleeve seat main board to restrict the range of movement of the damper.

As a preferred technical solution of the embodiment of the present application, a first end of the rotating arm member extends into the tail of the cup body cavity, connected to the cup body member through a pin; a second end of the rotating arm member is inserted into the U-shaped cavity of a first side arm of the arm body member and connected to the first side arm through a first eccentric pin, wherein: the U-shaped cavity comprises curved ears on both sides, which are configured to tightly hold the rotating arm member; the first eccentric pin comprises a first nail cap located at the head, a first nail pillar located at the middle, and a first nail strip located at the tail; wherein the first nail pillar is configured to extend into a first elliptical hole of the rotating arm member, the first nail strip is threaded through a first circular hole of the arm body member to connect with the arm body member, wherein the radius of the first nail cap is greater than the short radius of the first elliptical hole.

As a preferred technical solution of the embodiment of the present application, it also comprises a cover plate member, covering the surface of a second side arm of the arm body member; a second eccentric pin, comprising a second nail cap located at the head, a second nail pillar located at the middle, and a second nail strip located at the tail; the second nail pillar is configured to extend into a second elliptical hole of the cover plate member, the second nail strip is threaded through a second circular hole of the arm body member to connect with the arm body member, wherein the radius of the second nail cap is greater than the short radius of the second elliptical hole.

As a preferred technical solution of the embodiment of the present application, the cover plate member is provided with two extension buckles extending towards the second side arm near a first side edge of the first side arm, wherein the two extension buckles are opposite to notches on both sides of the second side arm, and the two extensions buckles fit against the notches on both sides of the second side arm; two adjacent side edges of a first side edge of the cover plate member are both provided with guide arms, the guide arms are configured to clamp the second side arm.

As a preferred technical solution of the embodiment of the present application, the cover plate member also is provided with a strip-shaped flange hole and a flange protrusion extending along the hole edge of the strip-shaped flange hole near the direction of the second side arm; the second side arm is provided with a square hole at a position opposite the flange protrusion; wherein the flange protrusion is configured to extend into the square hole.

As a preferred technical solution of the embodiment of the present application, it also comprises a first torsion spring located in a first hole slot of the cup body member and a second torsion spring located in a second hole slot of the cup body member, the first hole slot and the second hole slot are located on both sides of the damping assembly, wherein: the first torsion spring comprises a first straight leg extending in a first direction and a first bent leg extending in a second direction, the first straight leg has a first wear-resistant member; the first straight leg extends along the first direction out of the first hole slot and rests against a first arcuate plate of the rotating arm member; the first bent leg extends along the second direction out of the first hole slot and snaps into a first square hole of the cup body member; the second torsion spring comprises a second straight leg extending in the first direction and a second bent leg extending in the second direction, the second straight leg has a second wear-resistant member; the second straight leg extends along the first direction out of the second hole slot and rests against a second arcuate plate of the rotating arm member; the second bent leg extends along the second direction out of the second hole slot and snaps into a second square hole of the cup body member.

The beneficial effects achieved by the embodiment of the present application are: when the damping hinge is prone to issues due to the weight of the door being too large or the service life being too long, the switch toggle member on the damping hinge can be moved from the first position to the second position to reduce or eliminate the resetting action of the damper, thereby restoring the normal operation of the door body; solving the problem of the door closing being abnormally slow or unable to close due to the weight of the door being too large or the service life being too long; the switch toggle member can effectively improve the door closing speed and increase the service life of the damping hinge.

BRIEF DESCRIPTION OF THE DRAWINGS

The drawings are provided to further understand the present application and form a part of the description, used in conjunction with the embodiment of the present application to explain the application, and do not constitute a limitation on the application. In the drawings:

In FIGS. 1-13:

Figure 1:
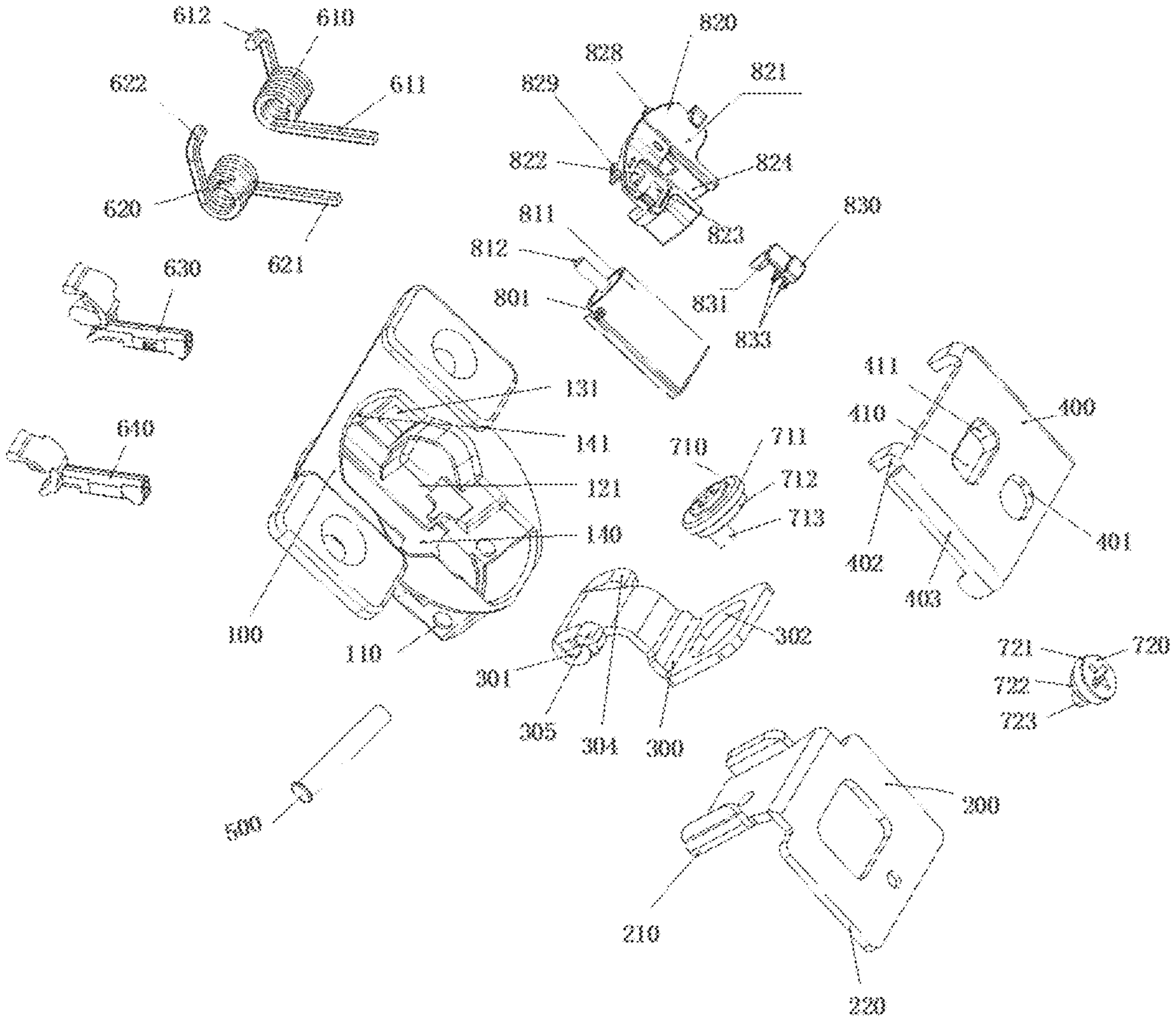
FIG. 1 is an overall exploded view diagram of the embodiment of the present application.
Figure 2:
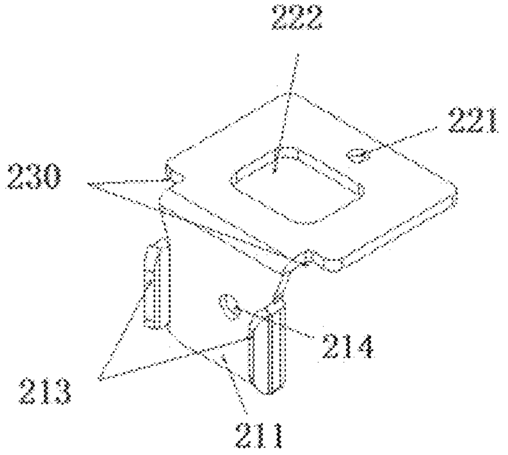
FIG. 2 is a structural diagram of the arm body member of the embodiment of the present application.
Figure 3:
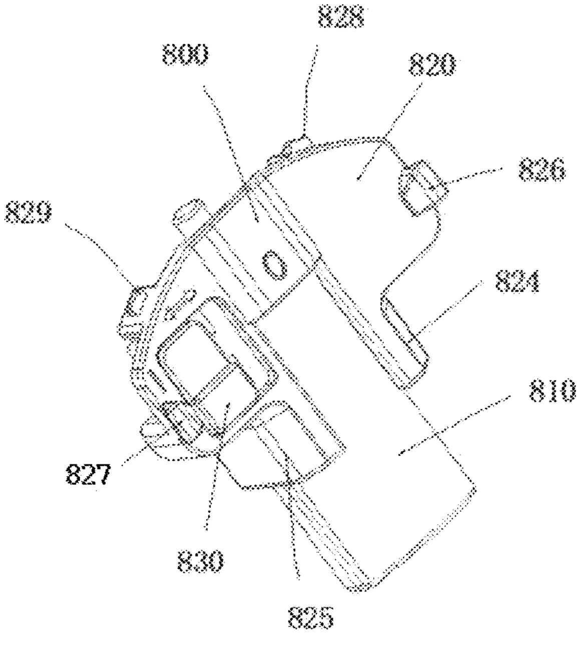
FIG. 3 is a structural diagram of the damping assembly of the embodiment of the present application.
Figure 4:
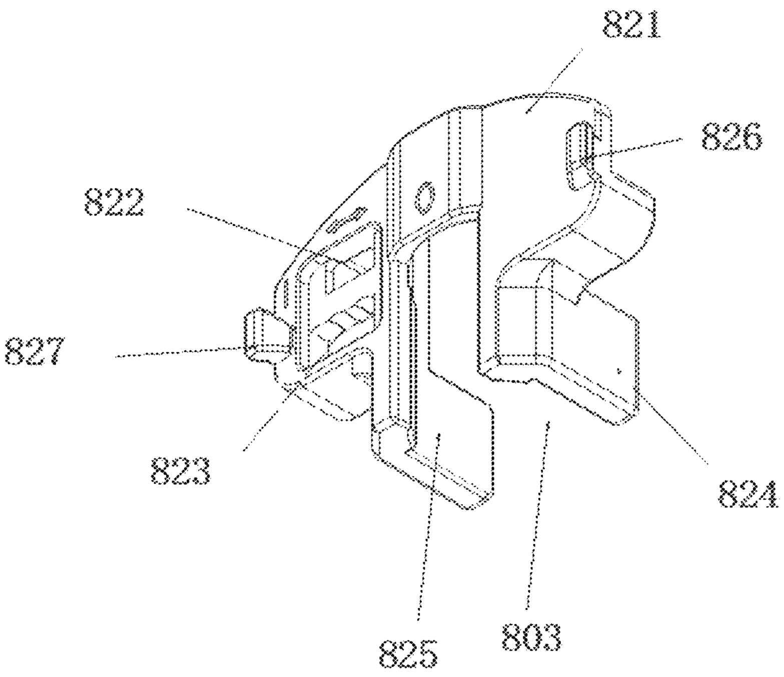
FIG. 4 is a structural diagram of the oil cylinder sleeve seat of the embodiment of the present application.
Figure 5:
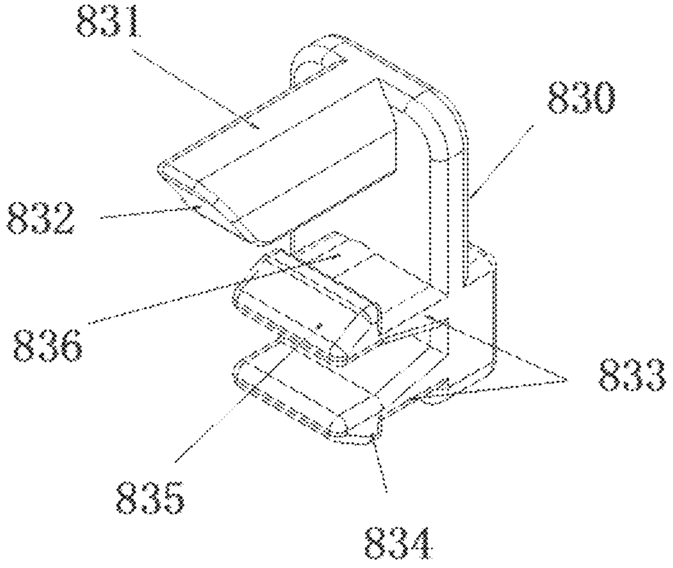
FIG. 5 is a structural diagram of the switch toggle member of the embodiment of the present application.
Figure 6:
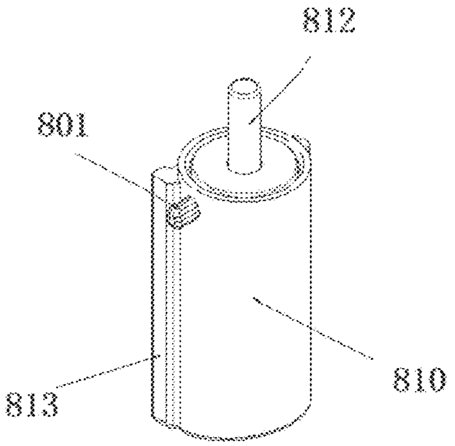
FIG. 6 is a structural diagram of the damper of the embodiment of the present application.
Figure 7:
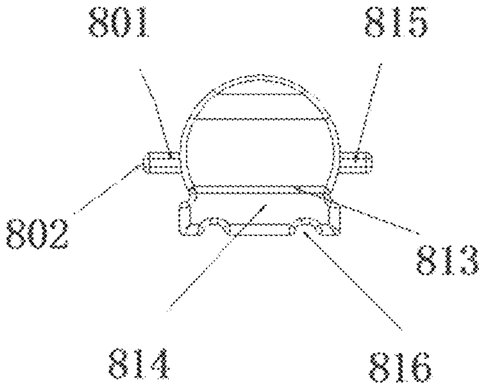
FIG. 7 is a structural diagram of the damper of the embodiment of the present application.
Figure 8:
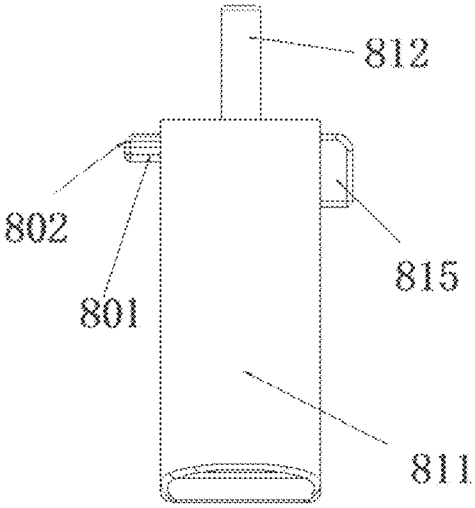
FIG. 8 is a schematic diagram of the use state of the embodiment of the present application.

100, cup body member; 110, cup body hole; 121, first hole slot; 131, first square hole; 140, cup body cavity; 141, hole in the wall; 200, arm body member; 210, first side arm; 211, U-shaped cavity; 213, curved ears on both sides; 214, first circular hole; 220, second side arm; 221, second circular hole; 222, square hole; 230, notches on both sides; 300, rotating arm member; 301, rotating arm hole; 302, first elliptical hole; 304, first arcuate plate; 305, second arcuate plate; 400, cover plate member; 401, second elliptical hole; 402, extension buckles; 403, guide arm; 410, strip-shaped flange hole; 411, flange protrusion; 500, pin; 610, first torsion spring; 611, first straight leg; 612, first bent leg; 620, second torsion spring; 621, second straight leg; 622, second bent leg; 630, first wear-resistant member; 640, second wear-resistant member; 710, first eccentric pin; 711, first nail cap; 712, first nail pillar; 713, first nail strip; 720, second eccentric pin; 721, second nail cap; 722, second nail pillar; 723, second nail strip; 800, damping assembly; 801, side ear member; 802, second inclined surface; 803, movement cavity; 810, damper; 811, oil cylinder; 812, rod body; 813, housing; 814, slider; 815, slide rail; 816, baffle plate; 820, oil cylinder sleeve seat; 821, sleeve seat platform; 822, first cavity; 823, second cavity; 824, first sleeve seat main board; 825, second sleeve seat main board; 826, first side wing convex body; 827, second side wing convex body; 828, first side wing protrusion; 829, second side wing protrusion; 830, switch toggle member; 831, toggle column; 832, first inclined surface; 833, barb member; 834, first barb; 835, second barb; 836, barb bump; 901, first position; 902, second position.

DETAILED DESCRIPTION

The following is a description of the preferred embodiment of the present application, which should be understood that the preferred embodiment described herein is only for the purpose of illustrating and explaining the present application and is not intended to limit the present application.

As shown in FIGS. 1-13, the embodiment of the present application provides a damping hinge, comprising a cup body member 100, an arm body member 200, a rotating arm member 300, a cover plate member 400, a pin 500, a first torsion spring 610, a second torsion spring 620, a first eccentric pin 710, a second eccentric pin 720, and a damping assembly 800.

The rotating arm member 300 is configured to connect the cup body member 100 and the arm body member 200, a first end of the rotating arm member 300 extends into the tail of the cup body cavity, passes through the cup body hole 110 of the cup body member 100 and the rotating arm hole 301 of the rotating arm member 300 through the pin 500 to connect the rotating arm member 300 with the cup body member 100; a second end of the rotating arm member 300 is inserted into the U-shaped cavity 211 of the first side arm 210 of the arm body member 200 and connected to the first side arm 210 through the first eccentric pin 710, wherein: the U-shaped cavity 211 comprises curved ears on both sides 213, which are configured to tightly hold the rotating arm member 300; the first eccentric pin 710 comprises a first nail cap 711 at the head, a first nail pillar 712 in the middle, and a first nail strip 713 at the tail, wherein the first nail pillar 712 is configured to extend into the first elliptical hole 302 of the rotating arm member 300, and the first nail strip 713 is threaded through the first circular hole 214 of the arm body member 200 to connect with the arm body member 200, wherein the radius of the first nail cap 711 is greater than the short radius of the first elliptical hole 302. In this embodiment, the arm body member 200 is tightly hold to the rotating arm member 300 through the curved ears on both sides 213 of the U-shaped cavity 211 set on the first side arm 210, which enhances the stability and strength of the connection between the arm body member 200 and the rotating arm member 300. During installation, the second end of the rotating arm member 300 can be horizontally inserted into the U-shaped cavity 211, and the curved ears on both sides 213 of the U-shaped cavity 211 can be pressed to tightly hold the second end of the rotating arm member 300; After pressing, the first nail pillar 712 of the first eccentric pin 710 is installed into the first elliptical hole 302, and the first nail strip 713 is threaded through the first circular hole 214 of the arm body member 200 for riveting with the arm body member 200.

The cover plate member 400 covers the surface of the second side arm 220 of the arm body member 200; the second eccentric pin 720 comprises a second nail cap 721 at the head, a second nail pillar 722 in the middle, and a second nail strip 723 at the tail; the second nail pillar 722 is configured to extend into the second elliptical hole 401 of the cover plate member 400, and the second nail strip 723 is threaded through the second circular hole 221 of the arm body member 200 to connect with the arm body member 200, wherein the radius of the second nail cap 721 is greater than the short radius of the second elliptical hole 401. The cover plate member 400 has two extension buckles 402 near the first side edge of the first side arm 210, extending towards the second side arm 220, wherein the two extension buckles 402 are opposite to notches on both sides 230 of the second side arm 220, and the two extensions buckles 402 fit against the notches on both sides 230 of the second side arm 220; two adjacent side edges of a first side edge of the cover plate member 400 are both provided with guide arms 403, the guide arms 403 are configured to clamp the second side arm 220. The cover plate member 400 also is provided with a strip-shaped flange hole 410 and a flange protrusion 411 extending along the edge of the strip-shaped flange hole 410 towards the second side arm 220; the second side arm 220 is provided with a square hole 222 at a position opposite the flange protrusion 411; wherein the flange protrusion 411 is configured to extend into the square hole 222. This embodiment enhances the stability of the cover plate member 400 with the arm body member 200 by setting the two extension buckles 402 on the cover plate member 400, and by tightly fitting the two extension buckles 402 with the notches on both sides 230 of the second side arm 220; by setting guide arms 403 on two adjacent side edges of the first side edge of the cover plate member 400 and providing a flange protrusion 411 for cooperation with the square hole 222 on the cover plate member 400, it can effectively prevent accidental deviation when adjusting the cover plate member 400 and the arm body member 200 with the second eccentric pin 720, further enhancing the stability of the cover plate member 400 and the arm body member 200, thereby increasing the service life of the hinge.

The first torsion spring 610 is located in the first hole slot 121 of the cup body member 100, the second torsion spring 620 is located in the second hole slot (not shown in the figure) of the cup body member 100, the first hole slot 121 and the second hole slot (not shown in the figure) are located on both sides of the damping assembly 800, wherein: the first torsion spring 610 comprises a first straight leg 611 extending in the first direction and a first bent leg 612 extending in the second direction, the first straight leg 611 has a first wear-resistant member 630; the first straight leg 611 extends along the first direction out of the first hole slot 121 and rests against the first arcuate plate 304 of the rotating arm member 300; the first bent leg 612 extends along the second direction out of the first hole slot 121 and fastens into the first square hole 131 of the cup body member 100; the second torsion spring 620 comprises a second straight leg 612 extending in the first direction and a second bent leg 622 extending in the second direction, the second straight leg 612 has a second wear-resistant member 640; the second straight leg 612 extends along the first direction out of the second hole slot (not shown in the figure) and rests against the second arcuate plate 305 of the rotating arm member 300; the second bent leg 622 extends along the second direction out of the second hole slot (not shown in the figure) and fastens into the second square hole (not shown in the figure) of the cup body member 100. This embodiment enhances the stability of the first torsion spring 610 and the second torsion spring 620 in the cup body member 100 by fastening the first bent leg 612 into the first square hole 131 of the cup body member 100 and the second bent leg 622 into the second square hole (not shown in the figure) of the cup body member 100; by providing the first wear-resistant member 630 on the first straight leg 611 and the second wear-resistant member 640 on the second straight leg 612, it enhances the service life of the first torsion spring 610 and the second torsion spring 620, thereby further increasing the service life of the hinge.

The damping assembly 800 is located within the cup body cavity 140 of the cup body member 100, the damping assembly comprises a damper 810, a oil cylinder 811 sleeve seat 820, and a switch toggle member 830.

The damper 810 is located within the cup body cavity 140, a side of the damper is provided with a side ear member 801.

The oil cylinder 811 sleeve seat 820 is fixed within the cup body cavity 140 and comprises a movement cavity 803 for the damper 810 to move and a track for the side ear member 801 to move.

The switch toggle member 830 is movably connected on the sleeve seat platform 821 of the oil cylinder 811 sleeve seat 820 and comprises a toggle column 831 that extends into the sleeve seat platform 821; wherein, under the action of an external force, the switch toggle member 830 is moved from a first position 901 to a second position 902, the toggle column 831 moves to the track to restrict the range of movement of the side ear member 801 and restricts the range of movement of the damper 810 within the movement cavity 803. This embodiment enhances the range of use of the damping hinge by configuring the switch toggle member 830, and by adjusting the position of the switch toggle member 830 to control the usage of the damper 810 in the hinge.

The bottom of the toggle column 831 is provided with a first inclined surface 832; the end of the side ear member 801 is provided with a second inclined surface 802 that cooperates with the first inclined surface 832; wherein, when the switch toggle member 830 is in the second position 902, under the action of an external force, the side ear member 801 is displaced on the track by the second inclined surface 802 cooperating with the first inclined surface 832. When the switch toggle member 830 is in the second position 902, under the action of an external force, it is possible to force the side ear member 801 of the damper 810 through the toggle column 831 by the first inclined surface 832 cooperating with the second inclined surface 802, thus putting the damper 810 in a disabled state. This embodiment, by configuring the first inclined surface 832 and the second inclined surface 802, allows the switch toggle member 830 to shut off the damper 810 at any state of the hinge, reducing the difficulty of operation and enhancing practicality.

The switch toggle member 830 also comprises a barb member 833, the barb member 833 comprises a first barb 834 and a second barb 835 that extend outwards, and both the first barb 834 and the second barb 835 are provided with barb bumps 836 on their outer sides; the sleeve seat platform 821 is provided with a first cavity 822 for the toggle column 831 to move and a second cavity 823 for the barb member 833 to move, wherein the second cavity 823 is provided with a cavity recess (not shown in the figure) opposite the barb bumps 836. This embodiment, by configuring the barb member 833, can effectively prevent the issue of the switch toggle member 830 easily popping out and becoming ineffective when the side ear member 801 forcefully passes through the toggle column 831, enhancing the service life of the switch toggle member 830.

The oil cylinder 811 sleeve seat 820 comprises: a first sleeve seat main board 824 and a second sleeve seat main board 825, located on both sides of the bottom of the sleeve seat platform 821, the first sleeve seat main board 824, the second sleeve seat main board 825, and the bottom wall of the cup body cavity 140 form the movement cavity 803; a first side wing convex body 826 and a second side wing convex body 827, located on both sides of the surface of the sleeve seat platform 821, configured to buckle into the square hole (first square hole 131 and second square hole, not shown in the figure) opposite the position of the cup body member 100; a first side wing protrusion 828 and a second side wing protrusion 829, located on one side of the platform 821 of the cylinder sleeve seat 820 away from the arm body member 200, configured to clamp into the hole in the wall 141 opposite the position of the cup body member 100. This embodiment enhances the stability of the oil cylinder 811 sleeve seat 820 in the cup body member 100 by setting the first side wing convex body 826, the second side wing convex body 827, the first side wing protrusion 828, and the second side wing protrusion 829, thereby further increasing the service life of the hinge.

The damper 810 comprises a oil cylinder 811, a rod body 812 with one end extending into the oil cylinder 811 and the other end against the sidewall of the cup body member 100 away from the oil cylinder 811, and a housing 813 fixedly fitted on the surface of the oil cylinder 811, the bottom of the housing 813 being inclined, the side ear member 801 is located on one side of the housing 813, wherein the housing 813 comprises: a slider 814, located at the bottom of the housing 813, configured to lie flat against the bottom wall of the cup body cavity 140, the slider 814 is provided with at least one slide rail 815, wherein a slider strip (not shown in the figure) for the slide rail 815 to slide against is provided at the opposite position between the bottom wall and the slide rail 815; a baffle plate 816, located on one side of the housing 813 away from the side ear member 801, configured to cooperate with the second sleeve seat main board 825 to limit the range of motion of the damper 810. This embodiment prevents displacement of the position of the damper 810 by configuring the baffle plate 816, which affects the damping effect of the damper 810; by setting the bottom of the housing 813 to be inclined, the compression effect of the first end of the rotating arm member 300 on the shell 813 can be improved when the hinge is in use; by configuring the slider 814 in the housing 813 and the slider strip on the bottom wall of the cup body cavity 140, enhancing the damping effect of the damper 810, thereby further enhancing the effectiveness of the hinge.

Figure 9:
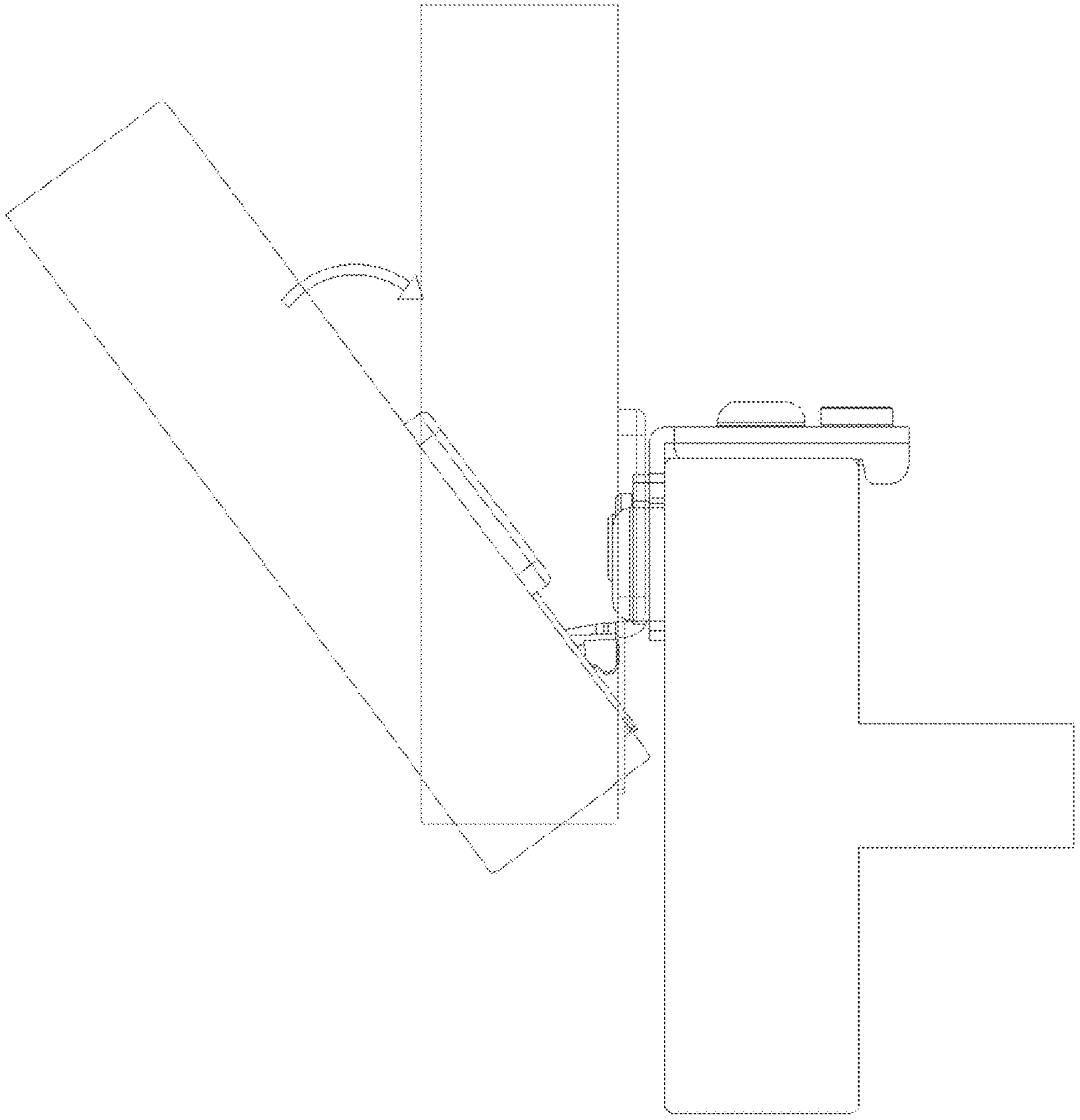
FIG. 9 is a structural diagram of the arm body member of the embodiment of the present application.

For ease of understanding, this embodiment also provides the working principle of the damping hinge, as follows:

As shown in FIG. 9, the cup body member 100 of the damping hinge is fixed to the door body, and the arm body member 200 is fixed to the door frame.

Regarding the working principle of the damper 810:

When the door body is closed, the oil cylinder 811 will move back under the pressure of the rotating arm member 300 until colliding with the sidewall of the cup body member 100, at this time, the rod body 812 of the oil cylinder 811 will retract into the body of the oil cylinder 811.

When the door body is opened, the end of the rod body 812 of the oil cylinder 811 will quickly extend the housing 813 of the oil cylinder 811 out, using the sidewall of the cup body member 100 as support, to reset to the state before the door closing action.

Wherein, when the door body is pushed to close to about 40-35 degrees, the first torsion spring 610 and the second torsion spring 620 on both sides of the cup body member 100 will exert pressure on the rotating arm member 300, and the resulting pressure will rotate the door body around the pin 500 to close the door; at the same time, the first end of the rotating arm member 300 will come into contact with the inclined bottom (bottom of the housing 813) of the damper 810 installed inside the cup body member 100, allowing the damping force of the damper 810 to cushion the inertia during the rotation of the door closing, so that the door body can close more slowly and gently, eliminating the noise generated by the impact of the door body against the door frame.

Figure 10:
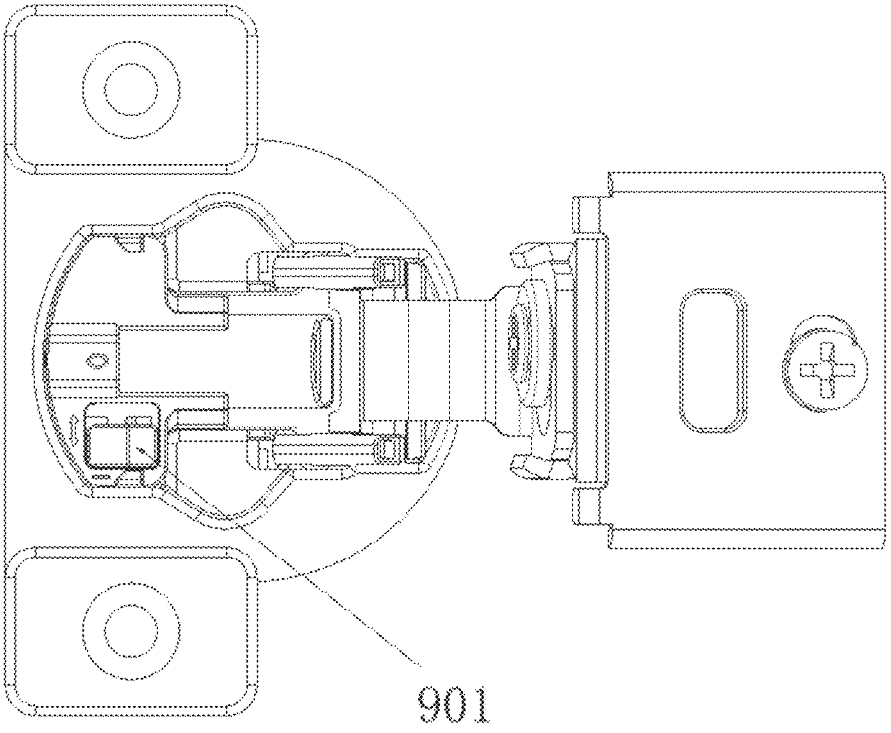
FIG. 10 is a structural diagram of the switch toggle member in the first position of the embodiment of the present application.
Figure 11:
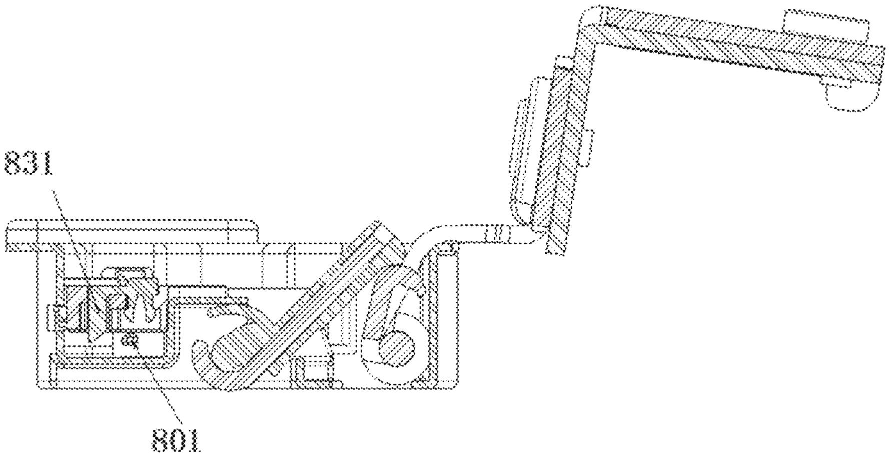
FIG. 11 is a structural diagram of the switch toggle member in the first position of the embodiment of the present application.

Regarding the working principle of the switch toggle member 830:

As shown in FIGS. 10-11, when the switch toggle member 830 is in the first position 901, the oil cylinder 811 will not be interfered by the switch toggle member 830 whether it is forced to move backward or extends to reset when the door is opened.

Figure 12:
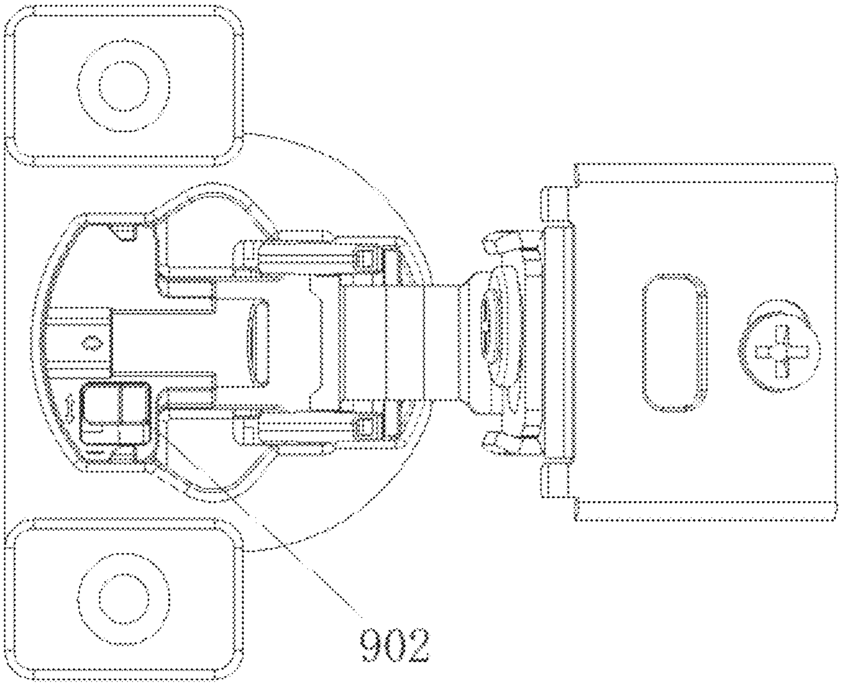
FIG. 12 is a structural diagram of the switch toggle member in the second position of the embodiment of the present application.
Figure 13:
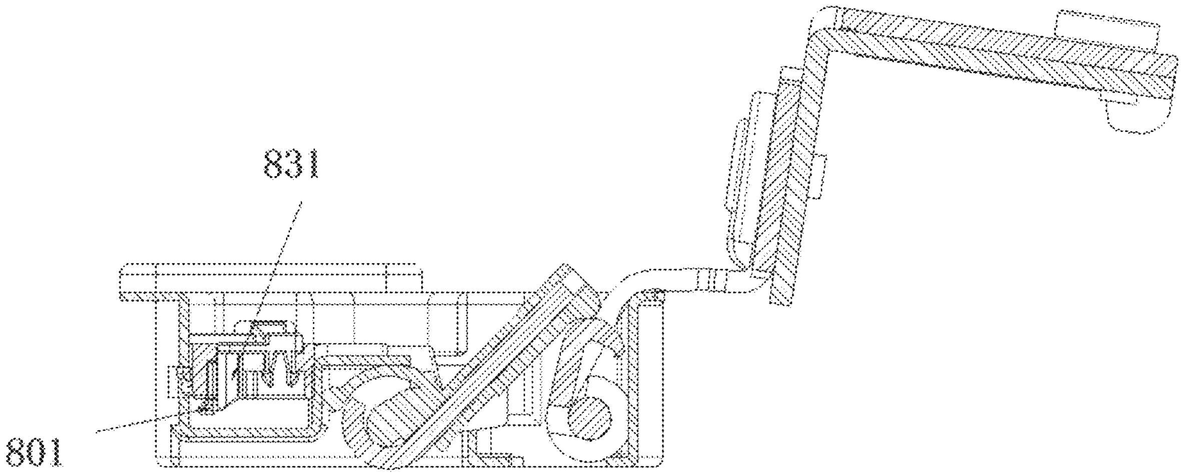
FIG. 13 is a structural diagram of the switch toggle member in the second position of the embodiment of the present application.

The damper used in the present invention is a compression damper. As shown in FIGS. 12-13, when the switch toggle member 830 is in the second position 902, the toggle column 831 of the switch toggle member 830 is on the track of the side ear member 801's movement. When the oil cylinder 811 moves back, the side ear member 801 on one side of the damper will be obstructed by the toggle column 831; if the oil cylinder 811 continues to move back under the action of an external force, then the first inclined surface 832 of the toggle column 831 will cooperate with the second inclined surface 802 of the side ear member 801, causing the toggle column 831 of the switch toggle member 830 to move up, allowing the side ear member 801 to forcefully pass through the toggle column 831; after the side ear member 801 passes through the toggle column 831, the toggle column 831 falls back, and by the toggle column 831 resisting the side ear body 801, the resetting action of the cylinder 811 is limited, at this time, the damping buffering effect of the damping hinge disappears.

Wherein, when the door body can close normally, there is no need to move the switch toggle member 830 to the second position 902, when the door body is too heavy or the damping hinge has been used for too long, causing the resilience of the damper 810 to decline, resulting in abnormally slow or unable to close, one or more of the switch toggle member 830 on the door body can be moved to the second position 902 to reduce or eliminate the resetting action of the damper 810, thereby restoring the normal operation of the door body. The switch toggle member 830 can effectively improve the door closing speed and increase the service life of the product.

Finally, it should be noted that the above are only examples of the present application and are not intended to limit the present application, although the present application has been described in detail with reference to the foregoing embodiment, those skilled in the art can still modify the technical solutions described in the foregoing embodiment, or make equivalent replacements for some of the technical features. Any modifications, equivalent replacements, improvements, etc. made within the spirit and principles of this application shall be comprised in the protection scope of this application

What is claimed is:

1. A damping hinge, comprising: a cup body member, an arm body member, a rotating arm member for connecting the said cup body member and the said arm body member, and a damping assembly located in a cup body cavity of the cup body member, wherein the damping assembly comprises:

a damper, located within the cup body cavity, with a side ear body on one side of the damper, wherein the damper of the damping assembly is configured to apply a damping force to the rotating arm;

an oil cylinder sleeve seat, fixed in the cup body cavity, comprising a movement cavity for the damper to move and a track for the side ear body to move;

a switch toggle member, movably connected to a sleeve seat platform of the oil cylinder sleeve seat, comprising a toggle column extending into the sleeve seat platform;

wherein under the action of external force, the switch toggle member is toggled from a first position to a second position, the toggle column moves to the track to restrict the range of movement of the side ear body, and restricts the range of movement of the damper in the movement cavity, the first position is the initial position where the toggle column of the switch toggle member has not entered the track, the second position is the position where the toggle column of the switch toggle member is inserted into the track, the external force is a force that the user manually applies to the switch toggle member;

wherein:

the switch toggle member also comprises a barb member, the barb member comprises a first barb and a second barb with barbs directed outward, the outer sides of the first barb and the second barb are both provided with a barb bump;

the sleeve seat platform is provided with a first cavity for the toggle column to move and a second cavity for the barb member to move, wherein the second cavity is provided with a cavity groove opposite to the barb bump.

2. The damping hinge according to claim 1, wherein:

the bottom of the toggle column has a first inclined surface;

the end of the side ear body has a second inclined surface that cooperates with the first inclined surface;

wherein, when the switch toggle member is in the second position, under the action of external force, the side ear body is displaced on the track through the second inclined surface cooperating with the first inclined surface.

3. The damping hinge according to claim 1, wherein the oil cylinder sleeve seat comprises:

a first sleeve seat main board and a second sleeve seat main board, located on both sides of the bottom of the sleeve seat platform, the first sleeve seat main board, the second sleeve seat main board, and a bottom wall of the cup body cavity form the movement cavity;

a first side wing convex body and a second wing convex body, located on both sides of the surface of the sleeve seat platform, configured to buckle into respective square holes opposite the position of the cup body member;

a first side wing protrusion and a second side wing protrusion, located on one side of the sleeve seat platform away from the arm body member, configured to clamp into respective holes in the wall opposite the position of the cup body member.

4. The damping hinge according to claim 3, wherein the damper comprises an oil cylinder, a rod body with one end extending into the oil cylinder and the other end resting against the sidewall of the cup body member away from the oil cylinder, and a housing fixedly fitted on the surface of the oil cylinder, the bottom of the housing being inclined, the side ear body located on one side of the housing, wherein the housing comprises:

a slider located at the bottom of the housing, configured to flat adhere to the bottom wall of the cup body cavity, the slider is provided with at least one slide rail, wherein a slide bar is provided at a position on the bottom wall of the cup body cavity that is opposite to the slide rail, and the slide bar is used for the slide rail to slide;

a baffle plate located on one side of the housing away from the side ear body, configured to cooperate with the second sleeve seat main board to restrict the range of movement of the damper.

5. The damping hinge according to claim 1, wherein:

a first end of the rotating arm member extends into a tail of the cup body cavity, connected to the cup body member through a pin;

a second end of the rotating arm member is inserted into a U-shaped cavity of a first side arm of the arm body member and connected to the first side arm through a first eccentric pin, wherein:

the U-shaped cavity comprises curved ears on both sides, which are configured to tightly hold the rotating arm member;

the first eccentric pin comprises a first nail cap located at a head, a first nail pillar located at the middle, and a first nail strip located at a tail; wherein the first nail pillar is configured to extend into a first elliptical hole of the rotating arm member, the first nail strip is threaded through a first circular hole of the arm body member to connect with the arm body member, wherein the radius of the first nail cap is greater than the short radius of the first elliptical hole.

6. The damping hinge according to claim 5, wherein the damping hinge also comprises:

a cover plate member, covering the surface of a second side arm of the arm body member;

a second eccentric pin, comprising a second nail cap located at a head, a second nail pillar located at the middle, and a second nail strip located at a tail;

the second nail pillar is configured to extend into a second elliptical hole of the cover plate member, the second nail strip is threaded through a second circular hole of the arm body member to connect with the arm body member, wherein the radius of the second nail cap is greater than the short radius of the second elliptical hole.

7. The damping hinge according to claim 6, wherein:

the cover plate member is provided with two extension buckles extending towards the second side arm near a first side edge of the first side arm, wherein the two extension buckles are opposite to notches on both sides of the second side arm, and the two extensions buckles fit against the notches on both sides of the second side arm;

two adjacent side edges of a first side edge of the cover plate member are both provided with guide arms, the guide arms are configured to clamp the second side arm.

8. The damping hinge according to claim 7, wherein:

the cover plate member also is provided with a strip-shaped flange hole and a flange protrusion extending along the hole edge of the strip-shaped flange hole near the direction of the second side arm;

the second side arm is provided with a square hole at a position opposite the flange protrusion;

wherein the flange protrusion is configured to extend into the square hole.

9. The damping hinge according to claim 1, wherein the damping hinge also comprises a first torsion spring located in a first hole slot of the cup body member and a second torsion spring located in a second hole slot of the cup body member, the first hole slot and the second hole slot are located on both sides of the damping assembly, wherein:

the first torsion spring comprises a first straight leg extending in a first direction and a first bent leg extending in a second direction, the first straight leg has a first wear-resistant member; the first straight leg extends along the first direction out of the first hole slot and rests against a first arcuate plate of the rotating arm member; the first bent leg extends along the second direction out of the first hole slot and snaps into a first square hole of the cup body member;

the second torsion spring comprises a second straight leg extending in the first direction and a second bent leg extending in the second direction, the second straight leg has a second wear-resistant member; the second straight leg extends along the first direction out of the second hole slot and rests against a second arcuate plate of the rotating arm member; the second bent leg extends along the second direction out of the second hole slot and snaps into a second square hole of the cup body member.

10. A damping assembly, installed within a cup body cavity of a cup body member of a damping hinge, is configured to provide a buffering force for a arm body member connected through a rotating arm member, wherein the damping assembly comprises:

a damper, located within the cup body cavity, with a side ear body on one side of the damper, wherein the damper of the damping assembly is configured to apply a damping force to the rotating arm;

an oil cylinder sleeve seat, fixed in the cup body cavity, comprising a movement cavity for the damper to move and a track for the side ear body to move;

a switch toggle member, movably connected to a sleeve seat platform of the oil cylinder sleeve seat, comprising a toggle column extending into the sleeve seat platform;

wherein under the action of external force, the switch toggle member is toggled from a first position to a second position, the toggle column moves to the track to restrict the range of movement of the side ear body, and restricts the range of movement of the damper in the movement cavity;

wherein:

the switch toggle member also comprises a barb member, the barb member comprises a first barb and a second barb with barbs directed outward, the outer sides of the first barb and the second barb are both provided with a barb bump;

the sleeve seat platform is provided with a first cavity for the toggle column to move and a second cavity for the barb member to move, wherein the second cavity is provided with a cavity groove opposite to the barb bump.

11. The damping assembly according to claim 10, wherein:

the bottom of the toggle column has a first inclined surface;

the end of the side ear body has a second inclined surface that cooperates with the first inclined surface;

wherein, when the switch toggle member is in the second position, under the action of external force, the side ear body is displaced on the track through the second inclined surface cooperating with the first inclined surface.

12. The damping assembly according to claim 10, wherein the oil cylinder sleeve seat comprises:

a first sleeve seat main board and a second sleeve seat main board, located on both sides of the bottom of the sleeve seat platform, the first sleeve seat main board, the second sleeve seat main board, and bottom wall of the cup body cavity form the movement cavity;

a first side wing convex body and a second wing convex body, located on both sides of the surface of the sleeve seat platform, configured to buckle into respective square holes opposite the position of the cup body member;

a first side wing protrusion and a second side wing protrusion, located on one side of the sleeve seat platform away from the arm body member, configured to clamp into respective holes in the wall opposite the position of the cup body member.

13. The damping assembly according to claim 12, wherein the damper comprises a oil cylinder, a rod body with one end extending into the oil cylinder and the other end resting against the sidewall of the cup body member away from the oil cylinder, and a housing fixedly fitted on the surface of the oil cylinder, the bottom of the housing being inclined, the side ear body located on one side of the housing, wherein the housing comprises:

a slider located at the bottom of the housing, configured to flat adhere to the bottom wall of the cup body cavity, the slider is provided with at least one slide rail, wherein a slide bar is provided at a position on the bottom wall of the cup body cavity that is opposite to the slide rail, and the slide bar is used for the slide rail to slide;

a baffle plate located on one side of the housing away from the side ear body, configured to cooperate with the second sleeve seat main board to restrict the range of movement of the damper.

14. The damping assembly according to claim 10, wherein:

a first end of the rotating arm member extends into a tail of the cup body cavity, connected to the cup body member through a pin;

a second end of the rotating arm member is inserted into a U-shaped cavity of a first side arm of the arm body member and connected to the first side arm through a first eccentric pin, wherein:

the U-shaped cavity comprises curved ears on both sides, which are configured to tightly hold the rotating arm member;

the first eccentric pin comprises a first nail cap located at a head, a first nail pillar located at the middle, and a first nail strip located at a tail; wherein the first nail pillar is configured to extend into a first elliptical hole of the rotating arm member, the first nail strip is threaded through a first circular hole of the arm body member to connect with the arm body member, wherein the radius of the first nail cap is greater than the short radius of the first elliptical hole.

15. The damping assembly according to claim 14, wherein the damping assembly also comprises:

a cover plate member, covering the surface of a second side arm of the arm body member;

a second eccentric pin, comprising a second nail cap located at a head, a second nail pillar located at the middle, and a second nail strip located at a tail;

the second nail pillar is configured to extend into a second elliptical hole of the cover plate member, the second nail strip is threaded through a second circular hole of the arm body member to connect with the arm body member, wherein the radius of the second nail cap is greater than the short radius of the second elliptical hole.

16. The damping assembly according to claim 15, wherein:

the cover plate member is provided with two extension buckles extending towards the second side arm near a first side edge of the first side arm, wherein the two extension buckles are opposite to notches on both sides of the second side arm, and the two extensions buckles fit against the notches on both sides of the second side arm;

two adjacent side edges of a first side edge of the cover plate member are both provided with guide arms, the guide arms are configured to clamp the second side arm.

17. The damping assembly according to claim 16, wherein:

the cover plate member also is provided with a strip-shaped flange hole and a flange protrusion extending along the hole edge of the strip-shaped flange hole near the direction of the second side arm;

the second side arm is provided with a square hole at a position opposite the flange protrusion;

wherein the flange protrusion is configured to extend into the square hole.

18. The damping assembly according to claim 10, wherein the damping assembly also comprises a first torsion spring located in a first hole slot of the cup body member and a second torsion spring located in a second hole slot of the cup body member, the first hole slot and the second hole slot are located on both sides of the damping assembly, wherein:

the first torsion spring comprises a first straight leg extending in a first direction and a first bent leg extending in a second direction, the first straight leg has a first wear-resistant member; the first straight leg extends along the first direction out of the first hole slot and rests against a first arcuate plate of the rotating arm member; the first bent leg extends along the second direction out of the first hole slot and snaps into a first square hole of the cup body member;

the second torsion spring comprises a second straight leg extending in the first direction and a second bent leg extending in the second direction, the second straight leg has a second wear-resistant member; the second straight leg extends along the first direction out of the second hole slot and rests against a second arcuate plate of the rotating arm member; the second bent leg extends along the second direction out of the second hole slot and snaps into a second square hole of the cup body member.

* * * * *